United States Patent [19]
Forbes

[11] Patent Number: 5,232,256
[45] Date of Patent: Aug. 3, 1993

[54] CAN PICKUP APPARATUS

[76] Inventor: James M. Forbes, R.R. #1, Box 171, New Douglas, Ill. 62074

[21] Appl. No.: 899,857

[22] Filed: Jun. 17, 1992

[51] Int. Cl.$^5$ .............................. B66C 1/42; B66C 1/04
[52] U.S. Cl. .................................. 294/19.1; 294/50.9; 294/65.5
[58] Field of Search ................. 294/19.1, 22, 50.9, 294/65.5, 104, 1.4

[56] References Cited

U.S. PATENT DOCUMENTS

| | | | |
|---|---|---|---|
| 2,304,677 | 12/1942 | Burnett | 294/50.9 |
| 2,554,911 | 5/1951 | Kettle | 294/50.9 |
| 2,806,733 | 9/1957 | Hund | 294/50.9 |
| 3,885,824 | 5/1975 | Hulst | 294/19.1 |
| 4,192,539 | 3/1980 | Broyles et al. | 294/19.1 |
| 4,938,516 | 7/1990 | Temple | 294/65.5 |

FOREIGN PATENT DOCUMENTS 1329639  5/1963  France ................................. 294/22

Primary Examiner—David M. Mitchell
Assistant Examiner—Dean J. Kramer
Attorney, Agent, or Firm—Leon Gilden

[57] ABSTRACT

An elongate shaft has a support plate cooperative with bifurcated legs to secure a can therebetween, with the legs operative through an actuator handle mounted at an upper end of the shaft structure to include a pistol handle having a cable directed throughout the shaft to effect selective movement of the legs permitting the grasping of a workpiece between the legs.

3 Claims, 4 Drawing Sheets

CAN PICKUP APPARATUS

BACKGROUND OF THE INVENTION

1. Field of the Invention

The field of invention relates to pickup structure, and more particularly pertains to a new and improved can pickup apparatus wherein the same is arranged for the pickup of various components such as cans for recycling and the like.

2. Description of the Prior Art

Pickup structure of various types are utilized throughout the prior art for the lifting of various components and exemplified by U.S. Pat. No. 4,185,448 to Blanco setting forth a combination rake and trash pickup tool having cooperating tying structure operative through a remote handle structure.

U.S. Pat. No. 3,527,492 to Hollis sets forth a trash pickup structure having a lever operative to effect engagement of cooperating pods for lifting of various components.

Various lifting structure for picking up of liter and the like is set forth in U.S. Pat. Nos. 4,909,554 and 4,856,835.

Accordingly, it may be appreciated that there continues to be a need for a new and improved can pickup apparatus as set forth by the instant invention which addresses both the problems of ease of use as well as effectiveness in construction in providing for a compact organization readily manipulated for lifting of various components such as cans not addressed by the prior art and in this respect, the present invention substantially fulfills this need.

SUMMARY OF THE INVENTION

In view of the foregoing disadvantages inherent in the known types of pickup structure now present in the prior art, the present invention provides a can pickup apparatus wherein the same utilizes an elongate shaft having a support plate cooperative with a bifurcated head to grasp can components. As such, the general purpose of the present invention, which will be described subsequently in greater detail, is to provide a new and improved can pickup apparatus which has all the advantages of the prior art can pickup apparatus and none of the disadvantages.

To attain this, the present invention provides an elongate shaft having a support plate cooperative with bifurcated legs to secure a can therebetween, with the legs operative through an actuator handle mounted at an upper end of the shaft structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved can pickup apparatus which has all the advantages of the prior art can pickup apparatus and none of the disadvantages.

It is another object of the present invention to provide a new and improved can pickup apparatus which may be easily and efficiently manufactured and marketed.

It is a further object of the present invention to provide a new and improved can pickup apparatus which is of a durable and reliable construction.

An even further object of the present invention is to provide a new and improved can pickup apparatus which is susceptible of a low cost of manufacture with regard to both materials and labor, and which accordingly is then susceptible of low prices of sale to the consuming public, thereby making such can pickup apparatus economically available to the buying public.

Still yet another object of the present invention is to provide a new and improved can pickup apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
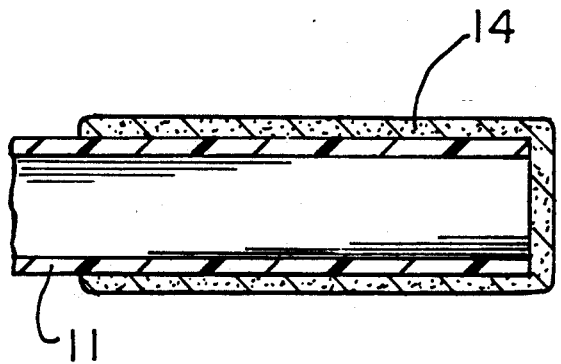
FIG. 2 is an orthographic view, taken along the lines 2—2 of FIG. 1 in the direction indicated by the arrows.

With reference now to the drawings, and in particular to FIGS. 1 to 9 thereof, a new and improved can pickup apparatus embodying the principles and concepts of the present invention and generally designated by the reference numeral 10 will be described.

More specifically, the can pickup apparatus 10 of the instant invention essentially comprises an elongate, longitudinally aligned tubular shaft 11 defined about a shaft axis 15 having a lower end 12 and an upper end 13 at opposed ends of the shaft. A resilient handle sleeve 14 is mounted to the upper end 13 for ease of manual grasping of the organization.

Figure 1:
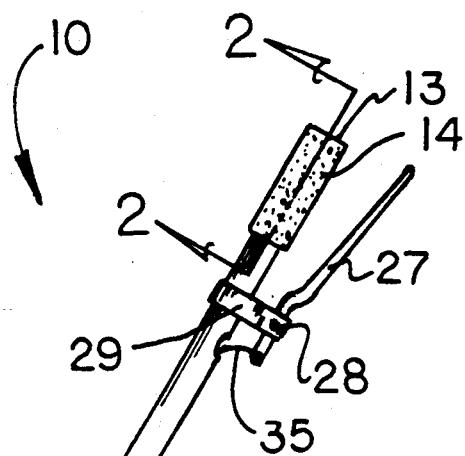
FIG. 1 is an orthographic view of the instant invention.
Figure 3:
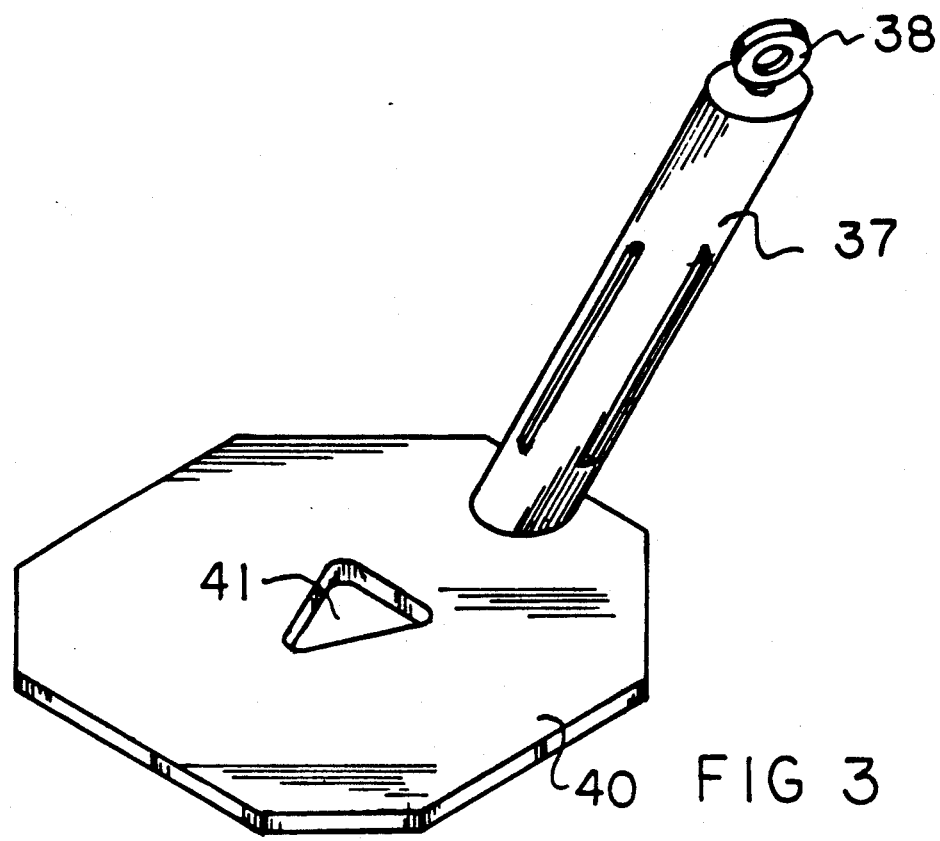
FIG. 3 is an isometric illustration of the support plate structure utilized by the invention.
Figure 4:
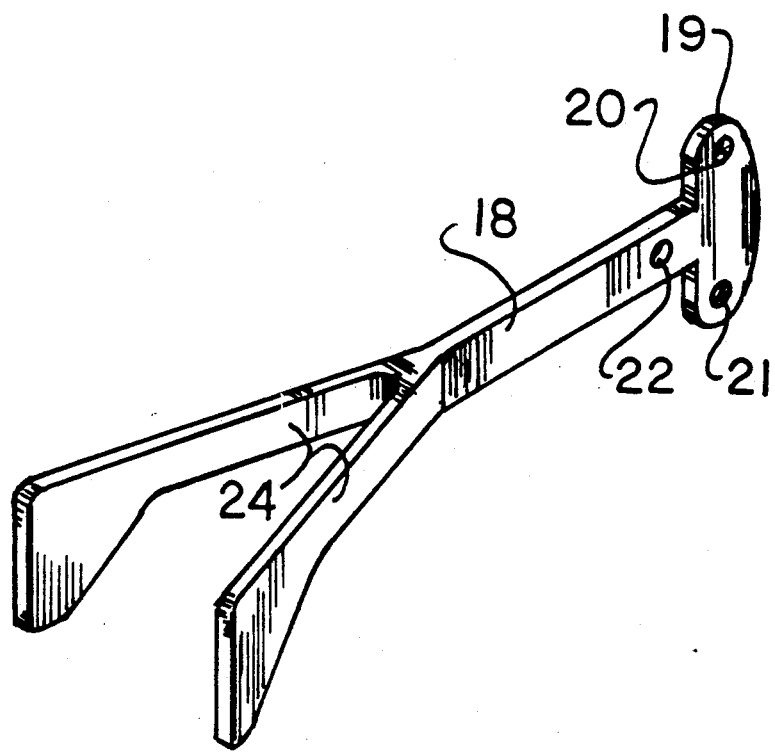
FIG. 4 is an isometric illustration of the bifurcated head structure utilized by the invention.

Spaced parallel mounting plates 16 are fixedly secured to the shaft in a spaced adjacency relative to the lower end 12 having an axle shaft 17 orthogonally directed between the mounting flanges 16 above the shaft 11, as illustrated in FIG. 1. A pivot leg 18 is provided having a pivot leg head 19 fixedly mounted to a first end of the pivot leg 18, to include a first bore 20 spaced above the pivot leg, and a second bore 21 spaced below the pivot leg, with the pivot leg having a pivot plate bore 22 directed through the pivot leg oriented medially of the first and second bores, with the pivot plate bore 22 receiving the axle shaft 17 and the pivot leg 18 directed into the tubular shaft 11 through a shaft slot 23 positioned between the mounting flanges 16. The pivot leg includes a second end having a bifurcated head mounted integrally thereto, to include spaced legs 24 longitudinally aligned relative to the pivot leg 18 projecting laterally and above the shaft 11.

Figure 5:
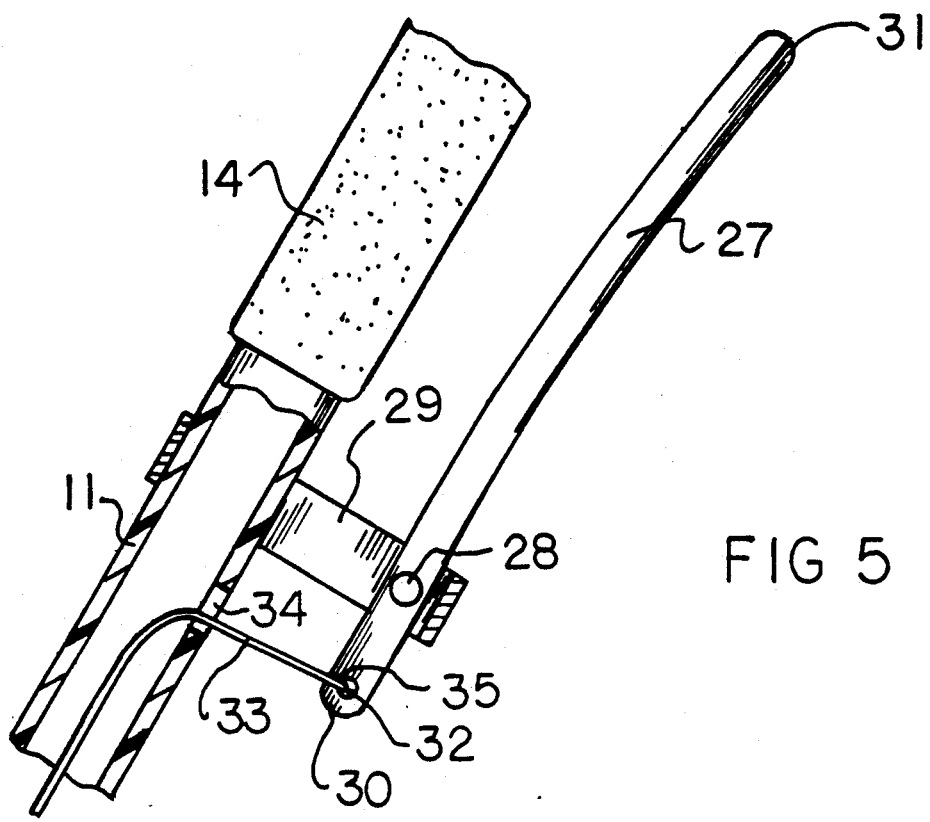
FIG. 5 is an orthographic view, partially in section, of an upper portion of the tubular shaft structure.
Figure 6:
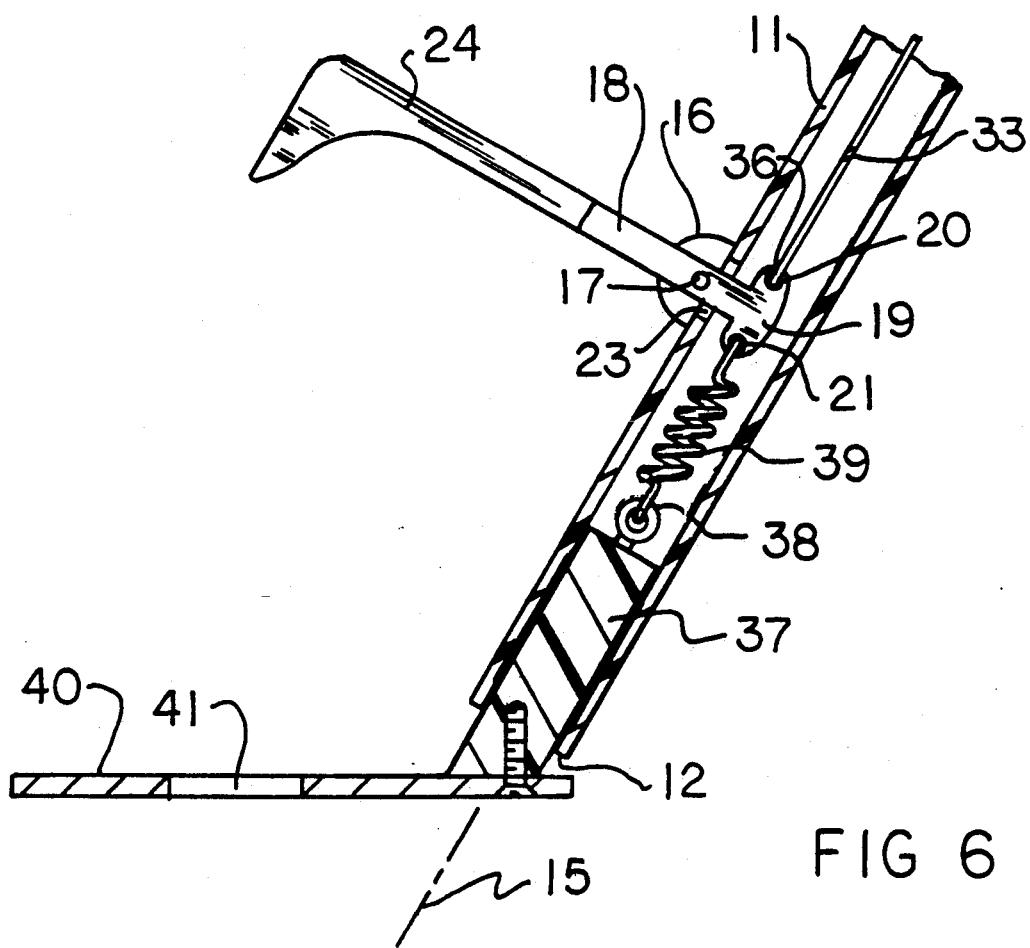
FIG. 6 is an orthographic view in cross-section of a lower portion of the shaft structure.

With reference to FIG. 5, an actuator handle 27 is provided, including a handle first end and a handle second end, with a handle axis 28 directed through the handle between the handle first end and the handle second end mounted to a handle support flange 29 that in turn is integrally mounted to the shaft 11 in adjacency to the resilient sleeve 14. The handle second end includes a receiving mount 32 securing a cable first end 35 of a cable 33 thereto. The cable 33 is directed into the shaft extending therethrough and entering through the shaft by a cable receiving slot 34 positioned in adjacency to and below the handle support flange 29. The cable second end 36 is mounted to the head first bore 20. A guide plug 37 is slidably received into the shaft 11 from the shaft lower end 12, with the guide plug 37 including a guide plug ring 38. The ring 38 includes a spring mounted thereto, with a spring member 39 having a spring first end mounted to the guide plug ring 38 and a spring second end mounted to the head second bore 21 to bias the guide plug 37 interiorly of the shaft upon tensioning of the cable 33 effecting simultaneous pivotment of the bifurcated head 24 towards a support plate 40 integrally mounted to a lower distal end of the guide plug 37 at an obtuse angle thereto. In this manner, the support plate 40 permits a scooping action to direct a can onto the support plate captured by downward pivotment of the bifurcated head defined by the spaced legs 24.

Figures 7, 8, 9:
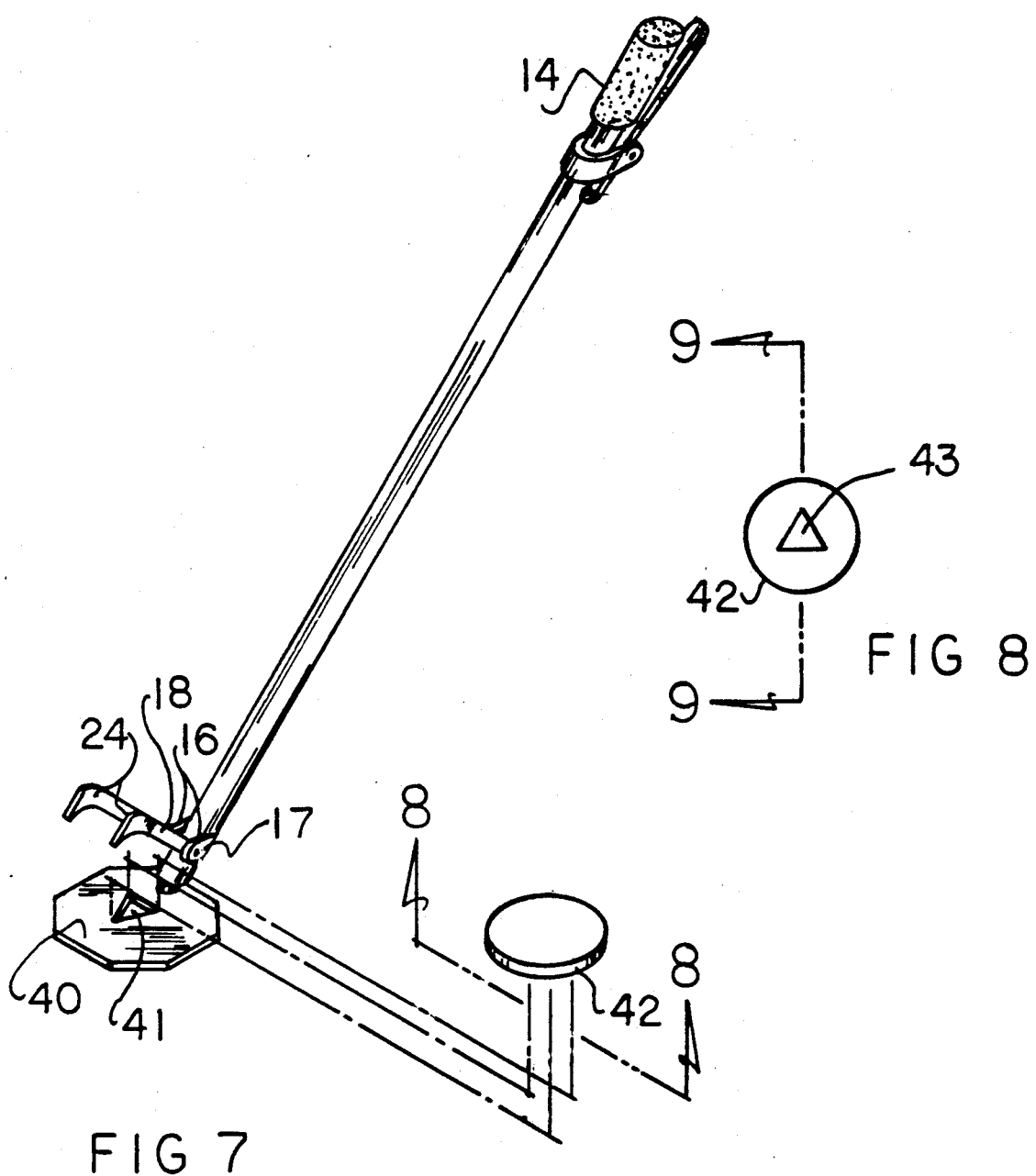
FIG. 7 is an isometric illustration of the invention utilizing accessory magnetic plate.
FIG. 8 is an orthographic view, taken along the lines 8—8 of FIG. 7 in the direction indicated by the arrows.
FIG. 9 is an orthographic view, taken along the lines 9—9 of FIG. 8 in the direction indicated by the arrows.

Reference to the FIGS. 7-9 indicates the use of a magnetic disc 42, with a disc bottom surface integrally positioned with a disc boss 43 defined by a predetermined configuration. The support plate 40 includes a support plate opening 41 defined by said predetermined configuration to complementarily receive the magnetic disc boss 43 therewithin to permit securement of ferrous metallic components onto the magnetic disc. The magnetic disc top surface includes a polymeric layer 45 coextensive therewith to minimize magnetic adherence to permit the ease of removal of ferrous metallic components positioned upon the magnetic disc captured by the bifurcated head structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A can pickup apparatus, comprising,
   an elongate tubular shaft having a shaft lower end and a shaft upper end, with the tubular shaft symmetrical about a shaft axle, and
   spaced parallel mounting flanges mounted fixedly to the shaft adjacent the lower end, with the mounting flanges including an axle shaft orthogonally directed between the mounting flanges, and
   a pivot leg pivotally mounted about the axle shaft, and
   a shaft slot directed through the tubular shaft between the mounting flanges, with the pivot leg projecting into the tubular shaft through the shaft slot having a first end, with the first end including a pivot leg head positioned within the shaft, and
   a bifurcated head, and
   the pivot leg having a second end, with the bifurcated head mounted fixedly to the second end spaced from the shaft, and
   a guide plug slidably directed into the shaft extending from the shaft lower end spaced from the pivot leg head, with the guide plug including a support plate fixedly mounted to the guide plug, with the support plate oriented below the shaft lower end, and
   actuator handle means mounted to the shaft in adjacency to the shaft upper end for effecting simultaneous contraction of the bifurcated head towards the support plate, and
   the pivot leg head includes a first bore and a second bore, with the first bore positioned above the pivot leg and the second bore positioned below the pivot leg, and the actuator handle means includes a handle first end and a handle second end, with a handle mount directed through the handle adjacent the second end, and an actuator cable, the actuator cable having an actuator cable first end secured to the actuator handle at the handle mount, and the shaft having a cable receiving slot through the shaft in adjacency to the handle second end, and the actuator handle including a handle axle, and a handle support flange fixedly mounted to the shaft adjacent the upper end, with the handle support flange fixedly mounted to the shaft adjacent the handle upper end, and the handle axle directed through the support flange in an orthogonal relationship, and the actuator cable having an actuator cable second end, with the actuator cable second end secured to the head first bore, and the guide plug including a guide plug ring fixedly mounted to the guide plug between the guide plug and the pivot leg head, and a spring member having a spring first end secured to the guide plug ring and a spring second end secured to the head second bore, whereupon tensioning of the actuator cable effects pivotment of the bifurcated head about the axle shaft directing the bifurcated head towards the support plate.

2. An apparatus as set forth in claim 1 wherein the bifurcated head includes a plurality of spaced legs integrally joined together at an acute included angle therebetween to effect wedging of a can component received between the spaced legs.

3. An apparatus as set forth in claim 2 wherein the support plate includes a support plate opening defined by a predetermined configuration, and a magnetic disc selectively securable to the support plate, wherein the magnetic disc includes a magnetic disc boss fixedly mounted to a bottom surface of the magnetic disc, the disc boss defined by said predetermined configuration to complementarily be received within the support plate opening, and the magnetic disc including a magnetic disc top surface having a polymeric layer positioned thereon.

* * * * *